UNITED STATES PATENT OFFICE.

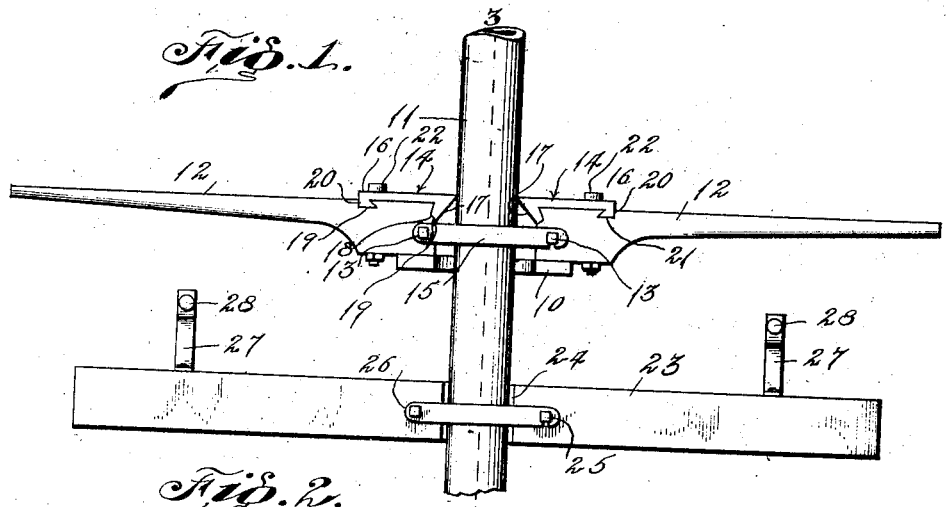
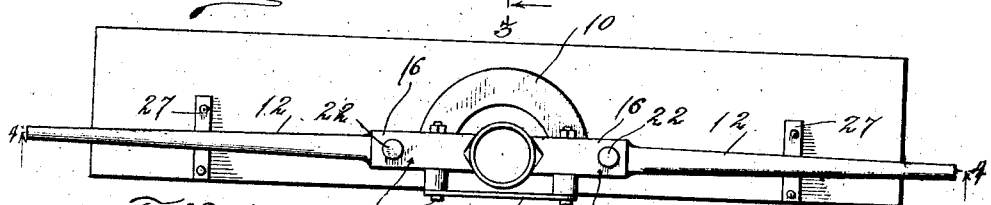
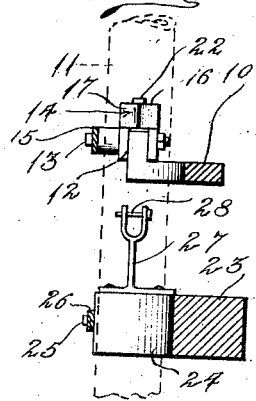
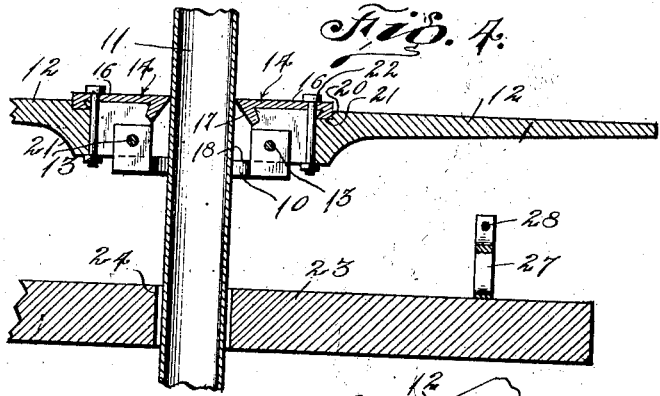
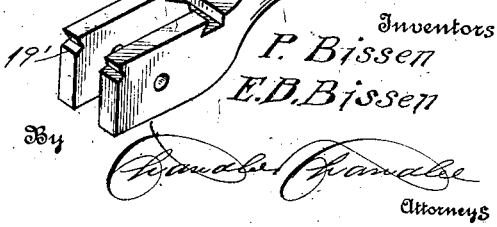

PAUL BISSEN AND EDWARD B. BISSEN, OF BROWNSVILLE, MINNESOTA.

WELL-PIPE LIFTER.

1,094,113.

Specification of Letters Patent. Patented Apr. 21, 1914.

Application filed September 6, 1912. Serial No. 718,985.

*To all whom it may concern:*

Be it known that we, PAUL BISSEN and EDWARD B. BISSEN, citizens of the United States, residing at Brownsville, in the county of Houston, State of Minnesota, have invented certain new and useful Improvements in Well-Pipe Lifters; and we do hereby declare the following to be a full, clear, and exact description of the invention, such as will enable others skilled in the art to which it appertains to make and use the same.

This invention relates to lifting device and more particularly to well pipe lifters.

An object of the invention is to provide a device of this character which may be readily connected with a well pipe and which will securely grip the same, whereby said pipe may be readily withdrawn from the well.

Another object is to provide a device of this character comprising a collar for engagement partly around the pipe with means for securely locking the collar around the pipe, and horizontal arms pivoted to the collar and having removable gripping jaws securely fastened upon their inner ends for gripping the pipe within the collar.

Another object is to provide a device of this character which will be of extremely simple construction and highly efficient and effective in use.

With the above and other objects in view, our invention will be more fully described, illustrated in the accompanying drawings, which show a preferred embodiment of our device and then specifically pointed out in the claim which is attached to and forms a part of this application.

In the drawings:—Figure 1 is an elevational view of the complete device in use. Fig. 2 is a top plan view thereof. Fig. 3 is a vertical sectional view on the line 3—3 of Fig. 1. Fig. 4 is a vertical sectional view on line 4—4 of Fig. 2. Fig. 5 is a detail view of one of the gripping jaws removed. Fig. 6 is a detail view of one of the handles upon which the jaws are secured.

Referring more specifically to the drawings, in which similar reference characters designate corresponding parts throughout, 10 designates the collar which is adapted for engagement partly around the pipe 11 and to opposite ends of which are pivoted the inner ends of the handles 12, it being understood that the collar 10 is of substantial semi-circular form and that each handle 12 is secured upon the pivot bolt 13 projecting from one end of the collar. The pivoted ends of the handles 12 are preferably enlarged and are spaced apart to accommodate the pipe 11 therebetween to be gripped by the jaws 14, as will presently be apparent. The latch member 15 is pivoted upon one of the pivot bolts 13 and adapted for engagement over the other pivot bolt 13, to hold the collar 10 and handles 12 in proper position around the pipe 11. Each jaw 14 has a flat upper face 16 leading downwardly and rearwardly slanting forward end 17 and a forward edge of the jaw is preferably V-shaped as shown at 18 for proper engagement with the pipe 11. The forward end of the jaw is extended at its lower edge below the main portion of the jaw and directed rearwardly, as shown at 19 for proper engagement against the upper corner of the end of the handle 12. The dove-tailed cross rib 20 is provided beneath the outer end of the jaw for engagement in the dove-tailed opening 21 in the upper face of the handle 12, thus securely fastening the jaw against longitudinal movement upon said handle. It will be understood that the jaw 14 is moved transversely upon the end of the handle 12, to its proper position, after which the bolt 22 is passed through from the upper face of said jaw into the handle 12 to securely fasten the jaw in position.

In use, the handles 12 are swung upon the pivot bolts 13 and the device moved longitudinally upon the pipe 11 to the desired position, after which the jaws 14 are engaged with the pipe and an upward pull exerted upon the handles, causing the jaws to bind against the pipe and raise the same.

When it is desired to use the device as a pipe holder, the base 23 divided intermediate its length with the pipe opening 24 opening upon one longitudinal edge, is placed in position beneath the collar 10 and handles 12, said base 23 being locked in position by means of the latch bolt 25 pivoted to one side of the opening 24, as shown at 26 and extending across said opening. The jaws 14 are then properly engaged with the pipe 11 and the handles 12 swung to their horizontal positions and placed in the forked upper ends of the supporting brackets 27 projecting from the upper face of the base, said handles being retained in the forked upper ends of the brackets by means of the pins 28 passed through said brackets 27 above the handles 12.

It will thus be seen that we have provided a pipe lifter of extremely simple construction and operation and which will be highly efficient and effective in use and which may be also employed for holding the pipe in proper position.

It will be evident that minor changes in the details of construction may be made within the scope of the claim without in the slightest degree departing from the spirit of our invention.

What we claim is:—

A pipe lifter for well pipes comprising a semi-circular pipe engaging member having transverse pivot pins projecting from its opposite ends, handles mounted upon said pivot pins with their inner ends spaced from one another, a latch member carried by one pivot pin and removably engaged with the other pivot pin, and removable jaws secured to said handles for engagement with the well pipe, said jaws each having a dove-tail tongue and groove connection with the related handle whereby displacement of said jaws from operative engagement with the pipe during lifting of the latter is positively prevented.

In testimony whereof we affix our signatures in presence of two witnesses.

PAUL BISSEN.
EDWARD B. BISSEN.

Witnesses:
JULIUS KNIGGE,
JOS. E. WILLIAMS.